Sept. 22, 1959
A. E. RANDOLPH
2,905,017
BICYCLE TRANSMISSION CONTROL
Filed July 25, 1957
2 Sheets-Sheet 1
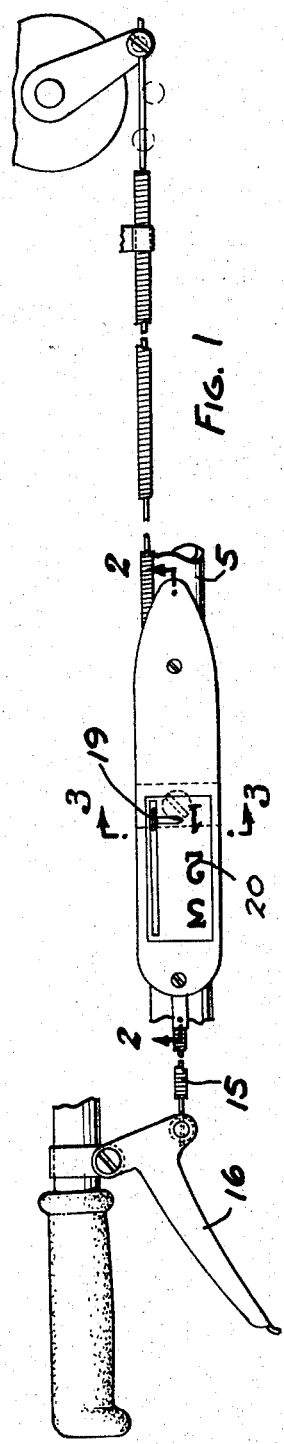
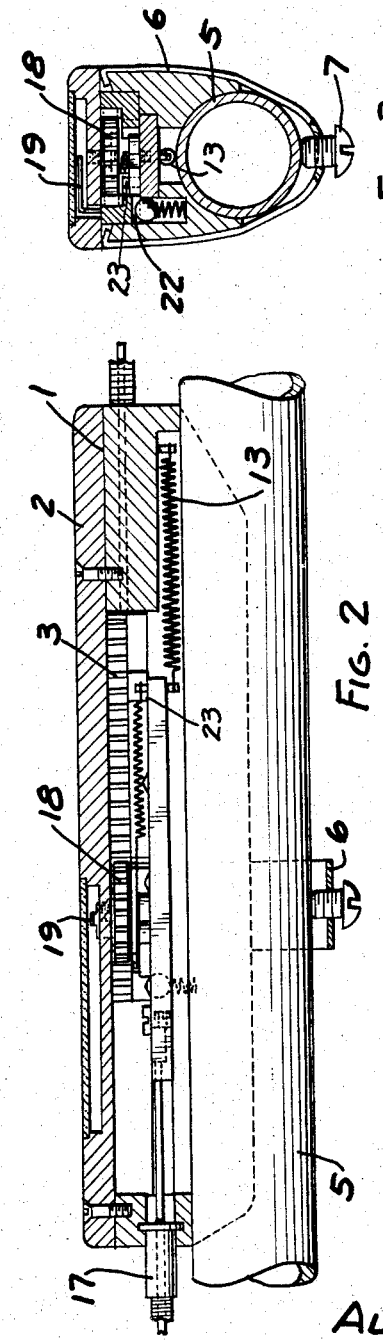
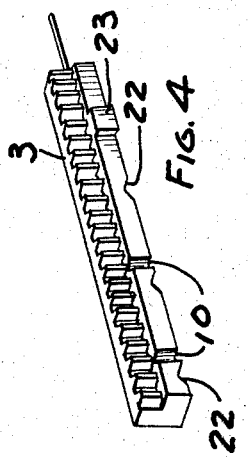
INVENTOR.
ALAN E. RANDOLPH
BY
Barnes, Kisselle, Laughlin & Raisch
ATTORNEYS Sept. 22, 1959     A. E. RANDOLPH     2,905,017

BICYCLE TRANSMISSION CONTROL

Filed July 25, 1957     2 Sheets-Sheet 2

INVENTOR.
ALAN E. RANDOLPH

BY

ATTORNEYS

United States Patent Office 2,905,017
Patented Sept. 22, 1959

2,905,017

BICYCLE TRANSMISSION CONTROL

Alan E. Randolph, Livonia, Mich., assignor to Allied Products Corporation, Detroit, Mich., a corporation of Michigan Application July 25, 1957, Serial No. 674,197

3 Claims. (Cl. 74—489)

This invention relates to a three-speed bicycle transmission control which is operated in three-speeds, forward, backward and automatically reversing all by squeezing a hand lever on the bicycle handle bars.

This transmission control is attached to the handle bars and has a cable connecting to the squeeze lever on the handle bar and a push and pull cable connected to a lever that operates the transmission. The casing has a window in its top and an indicator pointer moves with a slide in the transmission control for indicating in connection with numerals in which gear the transmission is.

The transmission control consists of a pair of opposed racks guided in a container and meshing with a pinion so that when one rack goes forward the other rack goes rearwardly. A pawl which is automatically shifted in engagement with one or the other racks serves to automatically reverse the transmission control.

Referring to the drawings:

Fig. 1 is a top plan view of the transmission control showing the outside of the casing.

Fig. 2 is a section taken on line 2—2 of Fig. 1.

Fig. 3 is a section taken on line 3—3 of Fig. 1.

Fig. 4 is a perspective of one of the racks.

Figure 5:
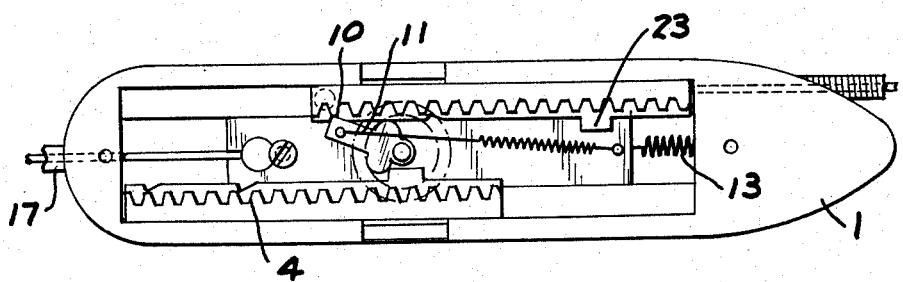
Fig. 5 is a plan view of the inside of the control showing the racks and pawl in the first speed position.

The mechanism is enclosed in a casing 1 which has a removable cover 2. Guided in the casing is a left hand toothed rack 3 and a right hand toothed rack 4. The casing is clamped to the tubular handle bars 5 by means of a clamp arm 6 and screw 7. The rack 3 is guided in a groove 8 of the casing and the other rack 4 is guided in a lower groove of the casing. Each rack has two notches 10 to receive the end of the pawl 11. The pawl is pivoted on the slide 12 which is guided in the casing and which has a spring 13 attached to the rear end tending to resist forward movement of the slide. The pawl has a spiral spring 14 which throws the pawl one way or the other over center to seat in one of the notches 10 of the racks. A cable 15 connects the hand lever 16 with a forward end of the slide and is passed through the guiding tube 17. A pinion 18 is rotatably supported inside the casing and engages the teeth of both racks. A pointer 19 is attached to the left-hand rack (Figs. 1, 2, and 3) and moves to 1, 2 and 3 positions at 20 (Fig. 1).

Figure 6:
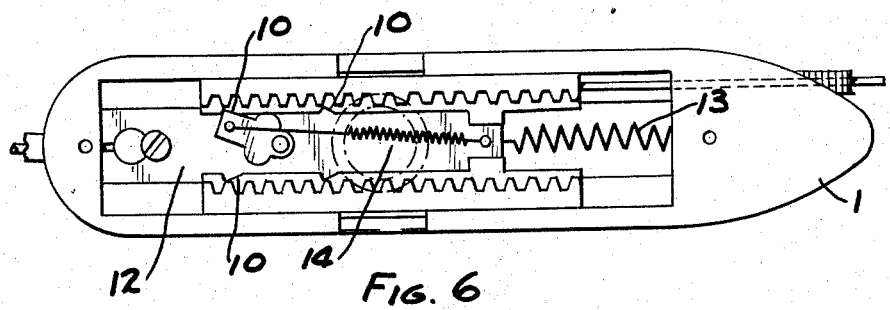
Fig. 6 is a similar view showing the racks in second speed and the slide before it has returned to its normal position.
Figure 7:
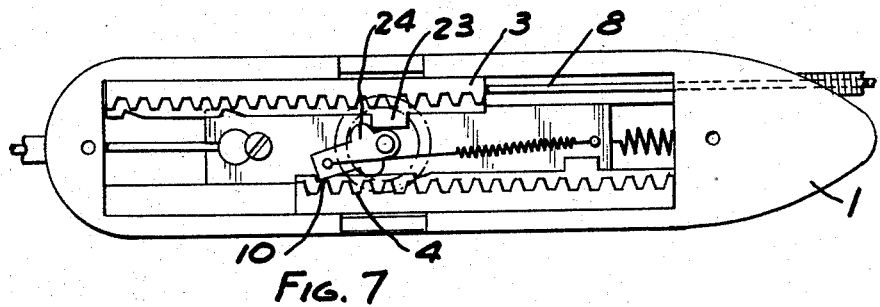
Fig. 7 is a similar view showing the racks in the position of third speed with the pawl shifted to reverse the direction of the speed control rack.

The operation is thus: From the position shown in Fig. 5 where the pawl engages the notch 10, which in this showing is the rack 3, a squeeze on the handle grips will cause the slide to move forward approximately ¾" from the position of the parts shown in Fig. 5 to the position of the parts shown in Fig. 6. A spring pressed ball 21 moves into notches 22 (Fig. 3) in the bottom of the left hand rack to hold the racks in each of the three-speed positions. When the third position is reached the lug 23 on the left hand rack strikes the projection 24 on the pawl and forces the pawl over center and into the notch 10 of the right hand rack. The next squeeze of the hand grip and lever will cause the slide to move forward carrying with it the right hand rack and the pinion engaging both racks will cause the left hand rack to move ¾" backward to the second speed. The third and fourth squeezes of the hand lever will cycle the transmission back from 3 to 1. Each time the hand lever is squeezed the slide moves forward and when the squeeze lever is released the spring 13 causes the slide to return to its rear position carrying with it the pawl, which on the second squeeze will be thrown over center into the notch 10 of the lower rack so the third and fourth squeezes will cause the lower rack to move forward to the forward position and cause the left hand or the upper rack, shown in Fig. 5, to move to the right hand position which is the first speed position.

So, by four successive squeezes on the hand lever and handle bar grip, the transmission control moves up from first speed to second speed, to third speed, and reverses itself and goes from third to second back to first.

What I claim is:

1. A three-speed bicycle transmission control having, in combination, a hand lever for pivoting on a handle bar next to a grip operated by four squeezes against the handle bar, a casing which can be secured to the handle bar, a left hand rack guided in the casing, a right hand rack guided in the casing, a pinion rotatably supported by the casing and having teeth engaging the teeth of both racks, each rack provided with notches, a slide contained and guided in the casing, a pivoted pawl on the slide spring-controlled to engage the notches of the two racks, a cable connecting the lever to the front of the slide, a second stiff cable connecting one rack to a crank on the bicycle transmission, a lug on each rack, one with the aid of the spring to throw the pawl over center from one rack to engage the notch in the other rack which automatically reverses the movement of the racks, the third squeeze of the lever and hand grip to move down the speed from third to second, the fourth squeeze of the hand lever to move the racks to the first speed position the other lug on the other rack to reverse the movements of the racks, and further squeezes to again cycle through the higher speeds and so move the control crank of the transmission, and means for holding the rack in each position.

2. The combination claimed in claim 1 in which the casing has a window with numbers 1, 2 and 3 at the side of the window and a pointer supported on one rack to indicate with the numbers which speed is in force.

3. The combination claimed in claim 1 in which one of the racks has notches in its bottom and a spring pressed ball to engage the notches successively to hold the racks in their positions of rest after being shifted from one speed to another.

References Cited in the file of this patent

UNITED STATES PATENTS

| | | |
|---|---|---|
| 2,558,502 | Williams | June 26, 1951 |
| 2,573,199 | Holman | Oct. 30, 1951 |

FOREIGN PATENTS

| | | |
|---|---|---|
| 1,121,909 | France | Aug. 28, 1956 |